(12) United States Patent
Im

(10) Patent No.: US 9,726,522 B2
(45) Date of Patent: Aug. 8, 2017

(54) MAGNETIC ENCODER STRUCTURE

(71) Applicant: HYUNDAI MOBIS CO., LTD., Seoul (KR)

(72) Inventor: Chul Soon Im, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 49 days.

(21) Appl. No.: 14/334,629

(22) Filed: Jul. 17, 2014

(65) Prior Publication Data

US 2015/0130448 A1 May 14, 2015

(30) Foreign Application Priority Data

Nov. 13, 2013 (KR) .................. 10-2013-0137702

(51) Int. Cl.
*G01B 7/30* (2006.01)
*G01D 5/245* (2006.01)
*G01D 5/14* (2006.01)
*G01D 5/244* (2006.01)

(52) U.S. Cl.
CPC .......... *G01D 5/2451* (2013.01); *G01D 5/145* (2013.01); *G01D 5/24433* (2013.01)

(58) Field of Classification Search
CPC ....... G01P 3/43; F16C 41/007; G01D 5/2451; G01D 5/145
USPC .................................................. 324/207.25
See application file for complete search history.

(56) References Cited

U.S. PATENT DOCUMENTS

| 6,998,748 B2 * | 2/2006 | Yeh | H02K 1/2786 |
| | | | 310/156.12 |
| 7,034,524 B2 * | 4/2006 | Schumacher | G01D 5/2451 |
| | | | 324/207.22 |
| 2013/0063138 A1 * | 3/2013 | Takahashi | G01D 5/2451 |
| | | | 324/207.25 |

FOREIGN PATENT DOCUMENTS

| DE | 19502367 A1 | 8/1996 | |
| DE | 19758037 | * 7/1998 | ............... G01B 7/00 |
| EP | 2003424 A2 | 12/2008 | |
| JP | 2005/308559 A | 11/2005 | |
| KR | 10-2009-0054525 A | 6/2009 | |

OTHER PUBLICATIONS

German Office Action for Application No. 10 2014 213 846.9, dated Jul. 23, 2015.

* cited by examiner

*Primary Examiner* — Reena Aurora

(57) ABSTRACT

A magnetic encoder structure according to an exemplary embodiment of the present invention includes: a back plate; and a magnet rubber which has a ring shape, and is vulcanized and attached to a rear surface of the back plate, in which the magnet rubber has a plurality of protruding portions which protrudes from an adhesive surface that is attached to the back plate, and groove portions which are formed between the protruding portions, and the protruding portions and the groove portions are repetitively disposed in a rotation direction of the magnet rubber.

10 Claims, 5 Drawing Sheets

[FIG. 1]
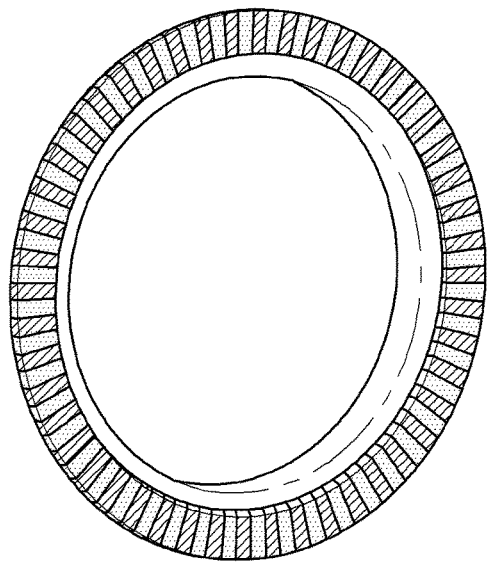
<Prior Art>
[FIG. 2]
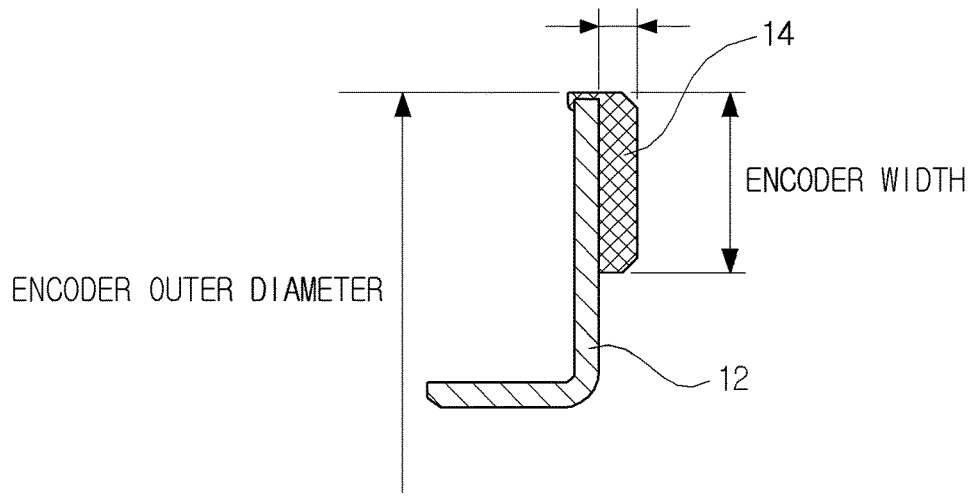
<Prior Art>

[FIG. 3] <Prior Art>
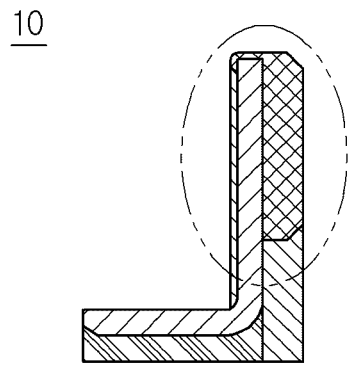
[FIG. 4] <Prior Art>
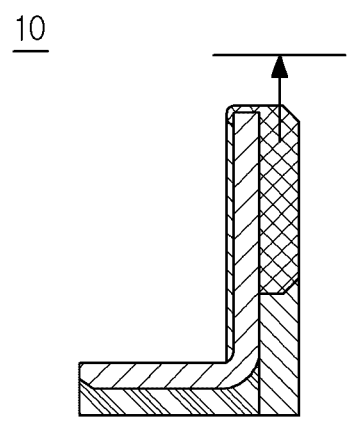
[FIG. 5] <Prior Art>
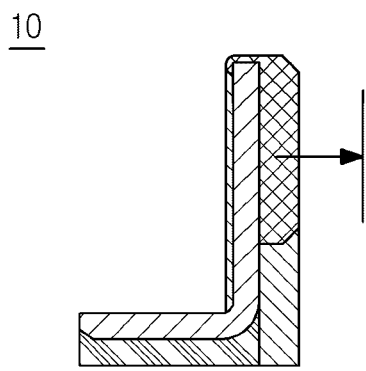

[FIG. 6]
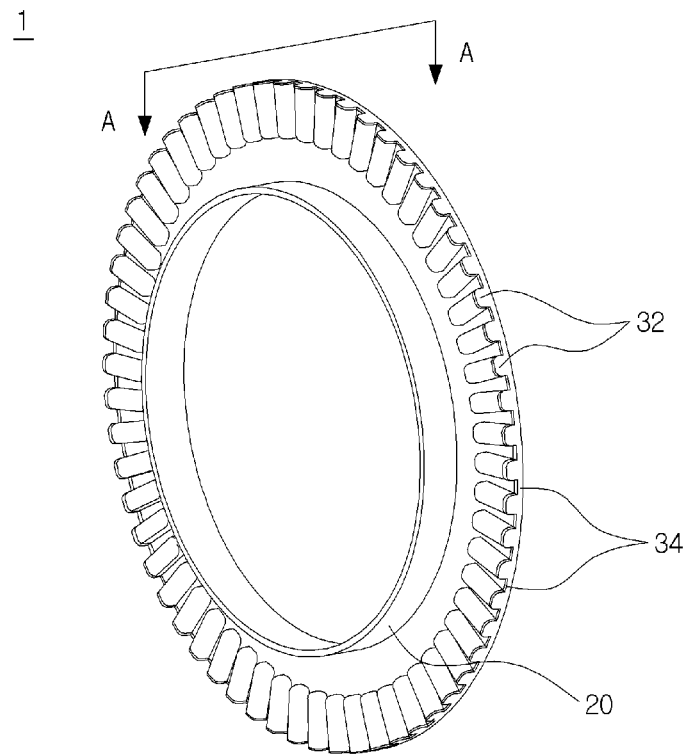
[FIG. 7]
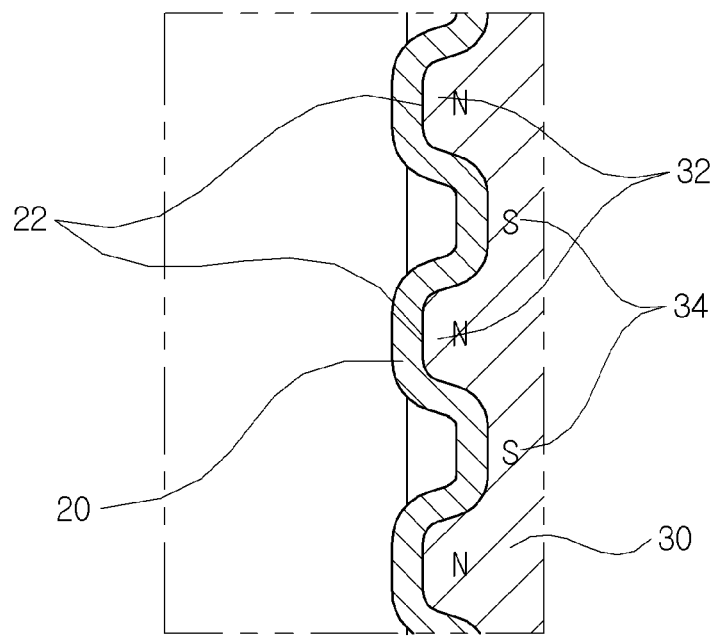

[FIG. 8]
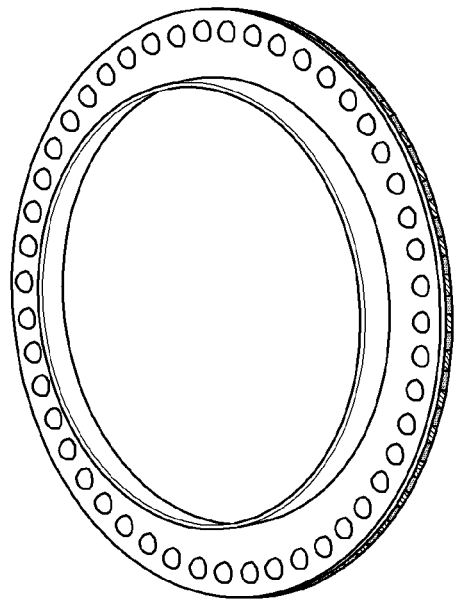
[FIG. 9]
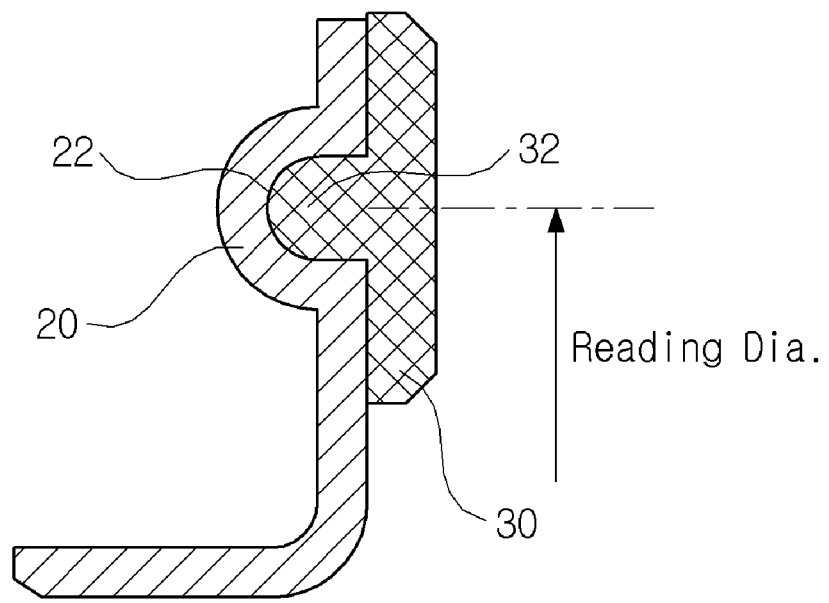

[FIG. 10]
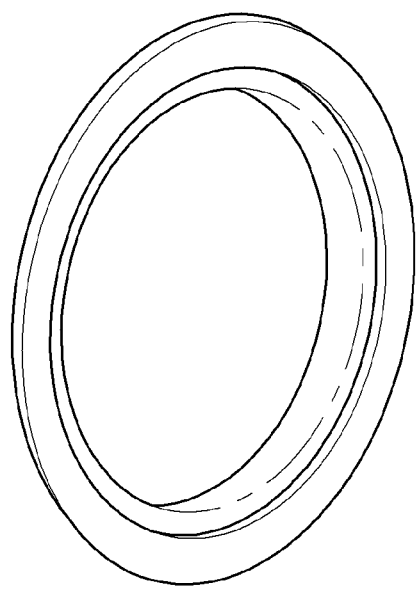
[FIG. 11]
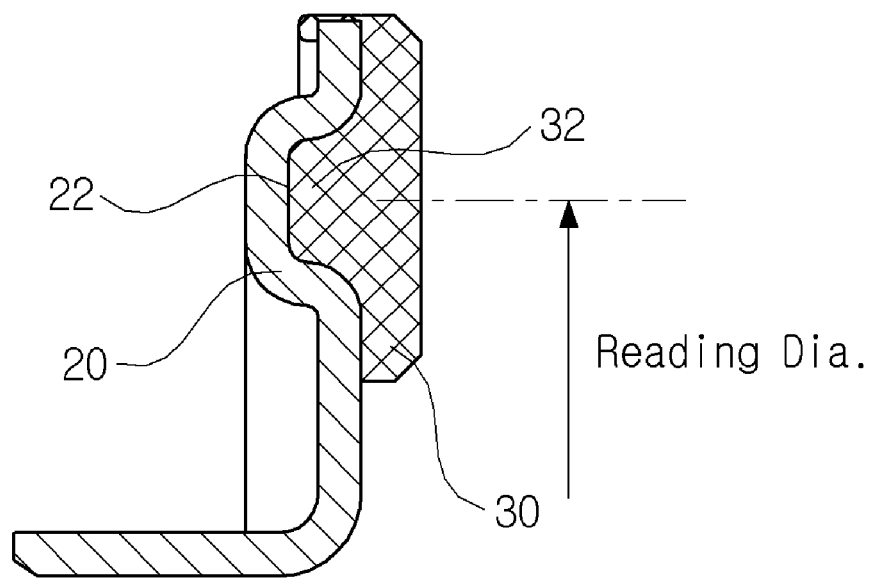

MAGNETIC ENCODER STRUCTURE

CROSS-REFERENCE TO RELATED APPLICATIONS

This application claims priority to and the benefit of Korean Patent Application No. 10-2013-0137702 filed in the Korean Intellectual Property Office on Nov. 13, 2013, the entire contents of which are incorporated herein by reference.

TECHNICAL FIELD

The present invention relates to a magnetic encoder structure, and more particularly, to a magnetic encoder structure which increases magnetic flux density by partially increasing a thickness of a magnetic encoder.

BACKGROUND ART

In general, an encoder is a device that detects a displacement, a rotation direction, and an angle. The encoder is also used in a vehicle, and the encoder is installed on a bearing device so as to detect the number of revolutions and a rotation direction of a wheel.

In the case of the existing wheel bearing, information on rotation speed is sensed by an ABS sensor from a serrated variation in height by applying a sintered wheel or a Preston wheel, but in the case of a magnetic encoder type wheel bearing, information on rotation speed is sensed by the ABS sensor from a variation in N/S poles of a magnet using a ferrite rubber magnet.

FIG. 1 is a perspective view of a magnetic encoder 10 in the related art, and FIG. 2 is a cross-sectional view of the magnetic encoder in the related art in a radial direction.

The magnetic encoder 10 in the related art includes a ring-shaped back plate 12 which has a cross section in the radial direction that is nearly vertically bent, and ring-shaped magnet rubbers 14 in which N poles and S poles are alternately arranged, and the magnet rubbers 14 are coupled to a rear surface of the back plate 12 along a circumference of the ring.

In general, the magnetic encoder is made of a rubber magnet (or a plastic magnet), and has a width of 5 to 6 mm, a thickness of 0.8 to 1.1 t, and a minimum outer diameter of φ62.

In a case in which it is necessary to improve output performance of the ABS sensor that uses the magnetic encoder, magnetic flux density (intensity of magnetism) of the encoder is increased.

FIGS. 3 to 5 illustrate a method of increasing the magnetic flux density. FIG. 3 is a view illustrating a case in which a material of the encoder is changed to a material (for example, a rare-earth magnet) having high magnetic flux density and large coercive force, FIG. 4 is a view illustrating a case in which an outer diameter of the magnetic encoder is increased, and FIG. 5 is a view illustrating a method of increasing a thickness of the magnetic encoder.

However, the method of increasing the magnetic flux density has problems in that costs are increased in comparison with the existing ferrite magnet when the material is changed (rare-earth magnet), the existing layout is changed when the outer diameter is increased, and costs are increased because an amount of input material is increased when the thickness is increased.

LITERATURE OF RELATED ART

Korean Patent Application Laid-Open No. 10-2009-0054525

SUMMARY OF THE INVENTION

The present invention has been made in an effort to provide a magnetic encoder structure which improves an ABS output performance by partially increasing a thickness of a magnetic encoder in comparison with the existing thickness.

The present invention has also been made in an effort to provide a magnetic encoder structure which reduces a weight and costs by partially increasing a thickness of the magnetic encoder.

An exemplary embodiment of the present invention provides a magnetic encoder structure which is installed on a wheel of a vehicle including: a back plate; and a magnet rubber which has a ring shape, and is vulcanized and attached to a rear surface of the back plate, in which the magnet rubber has a plurality of protruding portions which protrudes from an adhesive surface that is attached to the back plate, and groove portions which are formed between the protruding portions, and the protruding portions and the groove portions are repetitively disposed in a rotation direction of the magnet rubber.

The protruding portion of the magnet rubber may be magnetized to an N pole, and the groove portion of the magnet rubber may be magnetized to an S pole, such that magnetic flux density is increased.

The coupling grooves may be formed in the back plate so as to be spaced apart from each other at predetermined intervals in the rotation direction, and the coupling grooves may be coupled to the protruding portions.

The protruding portion may be formed at a recognition center at which magnetic force of the magnet rubber is recognized.

The protruding portion may have an embossing shape.

The protruding portion may have a protruding cross section in a radial direction that is formed in a quadrangular shape.

According to the magnetic encoder structure of the present invention, there is an effect in that the ABS output performance may be improved by partially increasing the thickness of the magnetic encoder in comparison with the existing thickness.

The thickness of the encoder was increased overall in the case of a method of increasing magnetic flux density of the magnetic encoder in the related art, but according to the present invention, there is an effect in that weight and costs may be reduced by partially increasing the thickness.

It was necessary to increase the outer diameter of the encoder in the case of a method of increasing magnetic flux density of the magnetic encoder in the related art, but according to the present invention, there is an effect in that the existing layout may be maintained by partially increasing the diameter and increasing magnetic flux density.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a perspective view illustrating a magnetic encoder structure in the related art.

FIG. 2 is a cross-sectional view in a radial direction of FIG. 1.

FIG. 3 is a view illustrating a case in which a material of an encoder is changed to a material (for example, rare-earth magnet) having high magnetic flux density and large coercive force in the magnetic encoder structure in the related art.

FIG. 4 is a view illustrating a case in which an outer diameter of the magnetic encoder is increased in the magnetic encoder structure in the related art.

FIG. 5 is a view illustrating a method of increasing a thickness of the magnetic encoder in the magnetic encoder structure in the related art.

FIG. 6 is a perspective view of a magnetic encoder structure according to an exemplary embodiment of the present invention.

FIG. 7 is a cross-sectional view taken along line A-A of FIG. 6.

FIG. 8 is a perspective view of the magnetic encoder structure to which an embossing shape is applied in accordance with the exemplary embodiment of the present invention.

FIG. 9 is a cross-sectional view of FIG. 8.

FIG. 10 is a perspective view of the magnetic encoder structure to which a right-angled shape is applied in accordance with the exemplary embodiment of the present invention.

FIG. 11 is a cross-sectional view of FIG. 10.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a magnetic encoder structure according to an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, but it is obvious that the technical spirit of the present invention is not restricted or limited thereto, but the exemplary embodiment of the present invention may be modified by a person with ordinary skill in the art to be variously performed.

FIG. 6 is a perspective view of a magnetic encoder structure according to an exemplary embodiment of the present invention, and FIG. 7 is a cross-sectional view of the magnetic encoder structure according to the exemplary embodiment of the present invention which is taken along line A-A.

Referring to FIGS. 6 and 7, a magnetic encoder structure 1 according to the exemplary embodiment of the present invention includes a back plate 20 which is installed on a bearing (not illustrated) of a vehicle, and a magnet rubber 30 which is vulcanized and attached to a rear surface of the back plate 20.

The magnet rubber 30 has a ring shape, and may be made of various materials having magnetism. In the exemplary embodiment, the magnet rubber 30 may be made of magnet plastic.

The magnet rubber 30 has protruding portions 32 which protrude from an adhesive surface that is attached to the back plate 20, and groove portions 34 which are provided between the protruding portions 32, and the protruding portions 32 and the groove portions 34 are repetitively disposed in a rotation direction.

The protruding portion 32 is magnetized to the N pole, and the groove portion 34 is magnetized to the S pole. The protruding portion 32 and the groove portion 34 may be magnetized in a reverse direction.

The back plate 20 has a ring shape, and has a cross section that is bent in a radial direction. The back plate 20 may have various materials and shapes so as to be coupled to the magnet rubber 30, and in the exemplary embodiment, a back yoke may also be used.

One or more coupling grooves 22 are formed in a cross section of the back plate 20 so as to be spaced apart from each other at predetermined intervals in the rotation direction. The coupling groove 22 may be coupled to the protruding portion 32 of the magnet rubber 30.

The magnet rubber 30 transmits information on rotation speed to an ABS sensor (not illustrated) using variation in the N/S poles of a magnet. In a case in which it is necessary to increase output performance of the ABS sensor, magnetic flux density (intensity of magnetism) of the magnet rubber 30 is increased, and the magnetic encoder structure 1 according to the exemplary embodiment of the present invention improves the output performance of the ABS sensor by increasing the magnetic flux density of only one of the N pole or the S pole.

A rotation detector (not illustrated), which is positioned at the rear of the magnet rubber 30 and recognizes a rotation, detects the rotation by sensing a variation in a magnetic field when the magnetic magnet rubber 30 is rotated, and in order to improve performance in detection of the rotation, the protruding portion 32 of the magnet rubber 30 is provided at a recognition center (Reading Dia.) at which magnetic force is recognized.

FIG. 8 is a perspective view of the magnetic encoder structure to which an embossing shape is applied in accordance with the exemplary embodiment of the present invention, FIG. 9 is a cross-sectional view of the magnetic encoder structure to which the embossing shape is applied in accordance with the exemplary embodiment of the present invention, FIG. 10 is a perspective view of the magnetic encoder structure to which a right-angled shape is applied in accordance with the exemplary embodiment of the present invention, and FIG. 11 is a cross-sectional view of the magnetic encoder structure to which a right-angled shape is applied in accordance with the exemplary embodiment of the present invention.

Referring to FIGS. 8 to 11, the protruding portion 32 of the magnet rubber 30 may have various shapes.

In the exemplary embodiment, in a case in which the protruding portion 32 of the magnet rubber 30 has an embossing shape, embossing portions are provided to be spaced apart from each other at predetermined intervals in the rotation direction, and a center of the embossing shape may be positioned at the recognition center of the rotation detector.

In another exemplary embodiment, a protruding cross section of the protruding portion 32 of the magnet rubber 30 is quadrangular, and a center of the cross section may be positioned at the recognition center of the rotation detector.

As described above, according to the magnetic encoder structure of the present invention, there is an effect in that ABS output performance may be improved by partially increasing the thickness of the magnetic encoder in comparison with the existing thickness.

The thickness of the encoder was increased overall in the case of a method of increasing magnetic flux density of the magnetic encoder in the related art, but according to the present invention, there is an effect in that weight and costs may be reduced by partially increasing the thickness.

It was necessary to increase the outer diameter of the encoder in the case of a method of increasing magnetic flux density of the magnetic encoder in the related art, but according to the present invention, there is an effect in that the existing layout may be maintained by partially increasing the diameter and increasing magnetic flux density.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A magnetic encoder structure which is installed on a wheel of a vehicle, the magnetic encoder structure comprising:
   a back plate; and
   a magnet rubber having a ring shape and being attached to a surface of the back plate,
   wherein the magnet rubber includes a plurality of protruding portions and a plurality of groove portions, the protruding portions and the groove portions being alternately disposed in a circumferential direction of the magnet rubber, each of the protruding portions having a first thickness, each of the groove portions having a second thickness, the first and second thicknesses being measured in a direction perpendicular to a plane defined by both the circumferential direction and a radial direction of the magnet rubber,
   wherein the back plate includes a plurality of coupling grooves that are arranged in the circumferential direction, each of the plurality of coupling grooves being indented in the direction perpendicular to the plane defined by the circumferential direction and the radial direction of the magnetic rubber, and
   wherein the coupling grooves are arranged at predetermined intervals in the circumferential direction, the coupling grooves being coupled to the protruding portions, respectively.

2. The magnetic encoder structure of claim 1, wherein each of the protruding portions of the magnet rubber is magnetized to have an N pole, and each of the groove portions of the magnet rubber is magnetized to have an S pole, such that a magnetic flux density of the magnet rubber is increased.

3. The magnetic encoder structure of claim 1, wherein each of the protruding portions has an embossing shape.

4. The magnetic encoder structure of claim 3, wherein the embossing shape is a hemispherical shape.

5. The magnetic encoder structure of claim 1, wherein each of the protruding portions has a cross-section parallel to the radial direction of the magnet rubber, the cross-section having a quadrangular shape.

6. The magnetic encoder structure of claim 1, wherein the protruding portions and the groove portions of the magnet rubber include a plastic magnet.

7. The magnetic encoder structure of claim 1, wherein the predetermined intervals are substantially equal to each other.

8. The magnetic encoder structure of claim 1, wherein adjacent coupling grooves are respectively coupled to adjacent protruding portions of the magnet rubber, each of the adjacent protruding portions is magnetized to entirely have an N pole.

9. A magnetic encoder structure which is installed on a wheel of a vehicle, the magnetic encoder structure comprising:
   a back plate; and
   a magnet rubber having a ring shape and being attached to a surface of the back plate,
   wherein the magnet rubber includes a plurality of protruding portions and a plurality of groove portions, the protruding portions and the groove portions being alternately disposed in a circumferential direction of the magnet rubber, each of the protruding portions having a first thickness, each of the groove portions having a second thickness, the first and second thicknesses being measured in a direction perpendicular to a plane defined by both the circumferential direction and a radial direction of the magnet rubber,
   wherein the back plate includes a plurality of coupling grooves that are arranged in the circumferential direction, each of the plurality of coupling grooves being indented in the direction perpendicular to the plane defined by the circumferential direction and the radial direction of the magnetic rubber, and
   wherein each of the protruding portions of the magnet rubber is magnetized to have an N pole, and each of the groove portions of the magnet rubber is magnetized to have an S pole, such that a magnetic flux density of the magnet rubber is increased.

10. The magnetic encoder structure of claim 9, wherein adjacent coupling grooves are respectively coupled to adjacent protruding portions of the magnet rubber, each of the adjacent protruding portions is magnetized to entirely have the N pole.

* * * * *